Sept. 17, 1968 B. C. MALONE 3,401,946

INFLATABLE DEVICE

Filed Aug. 7, 1967 8 Sheets-Sheet 1

Billy C. Malone
INVENTOR.

BY Hayden & Pravel

ATTORNEYS

Billy C. Malone
INVENTOR.

BY Hayden & Pravel

ATTORNEYS

INFLATABLE DEVICE

Filed Aug. 7, 1967

Billy C. Malone
INVENTOR.

BY Hayden & Pravel

ATTORNEYS

Billy C. Malone
INVENTOR.

BY Hayden & Pravel

ATTORNEYS

Sept. 17, 1968 B. C. MALONE 3,401,946

INFLATABLE DEVICE

Filed Aug. 7, 1967 8 Sheets-Sheet 5

Billy C. Malone
INVENTOR.

BY Hayden & Pravel

ATTORNEYS

Billy C. Malone
INVENTOR.

BY

Hayden Pravel Wilson & Matthews
ATTORNEYS

Sept. 17, 1968 B. C. MALONE 3,401,946

INFLATABLE DEVICE

Filed Aug. 7, 1967 8 Sheets-Sheet 7

Billy C. Malone
INVENTOR.

BY

Hayden Pravel Wilson & Matthews
ATTORNEYS

Sept. 17, 1968 B. C. MALONE 3,401,946

INFLATABLE DEVICE

Filed Aug. 7, 1967 8 Sheets-Sheet 8

Billy C. Malone
INVENTOR.

BY

Hayden Pravel Wilson & Matthews
ATTORNEYS

United States Patent Office 3,401,946 Patented Sept. 17, 1968

3,401,946

INFLATABLE DEVICE

Billy C. Malone, Houston, Tex., assignor to Lynes, Inc., a corporation of Texas

Continuation-in-part of application Ser. No. 400,510, Sept. 30, 1964. This application Aug. 7, 1967, Ser. No. 666,224
28 Claims. (Cl. 277—34.6)

ABSTRACT OF THE DISCLOSURE

An inflatable device including a body of generally annular configuration for positioning adjacent a tubular member, the body including a plurality of circumferentially spaced openings for receiving reinforced inflatable elements that extend longitudinally through the body and conduit means for inflating the reinforced elements to thereby expand the body.

*Cross reference to related application*

This application is a continuation-in-part of my prior copending application Ser. No. 400,510, filed Sept. 30, 1964.

*Background of the invention*

(1) *Field of the invention.*—The present invention relates to inflatable devices and more particularly to a device having a preferably annular body for positioning adjacent a member which serves as a backup, the body including a plurality of openings therein circumferentially spaced thereabout for receiving inflatable reinforced elements extending through said body and having reinforcing means extending longitudinally thereof and anchored at each end of each element with inflating means communicating with the inflatable elements so that they may be inflated and the annular body expanded radially relative to the member upon which it is mounted to form a closure or seal off either interiorly of the body if the annular body is positioned interiorly of the backup body or exteriorly of the body if the annular body is positioned adjacent the outer surface of the backup member.

(2) *Description of the prior art.*—The prior art includes the patent to T. E. Jamison, Jr., No. 2,783,028; A. A. Hollingsworth, No. 3,222,076; Goodman No. 1,906,151; Henderson, No. 1,221,733; Cavallaro, No. 672,475; F. G. Frantz, No. 2,233,205; J. Lynes, No. 2,611,437; and G. H. Allen, No. 2,778,432.

*Summary of the invention*

The present invention relates generally to a radially expandable and contractable inflatable arrangement which includes an annular resilient body having an axial opening extending longitudinally through the body and a plurality of circumferentially spaced openings extending through the body and spaced from the axial openings that also extends through the body. The openings are adapted to receive an inflatable element including means for communicating inflating fluid to expand the elements and annular body. The inflatable elements include a head at each end thereof, a resilient inner liner, a reinforcing sheath extending longitudinally between said heads and circumferentially of said liner, with means for securing the sheath in the heads.

The body of the foregoing construction may be initially formed on a tubular element or within a tubular element, or it and the inflatable elements may be formed separately and then shipped to the point of use and then secured to a tubular member or rigid housing by any suitable means.

Such construction has many applications as will be noted in greater detail hereinafter.

*Description of the preferred embodiments*

Figure 1:
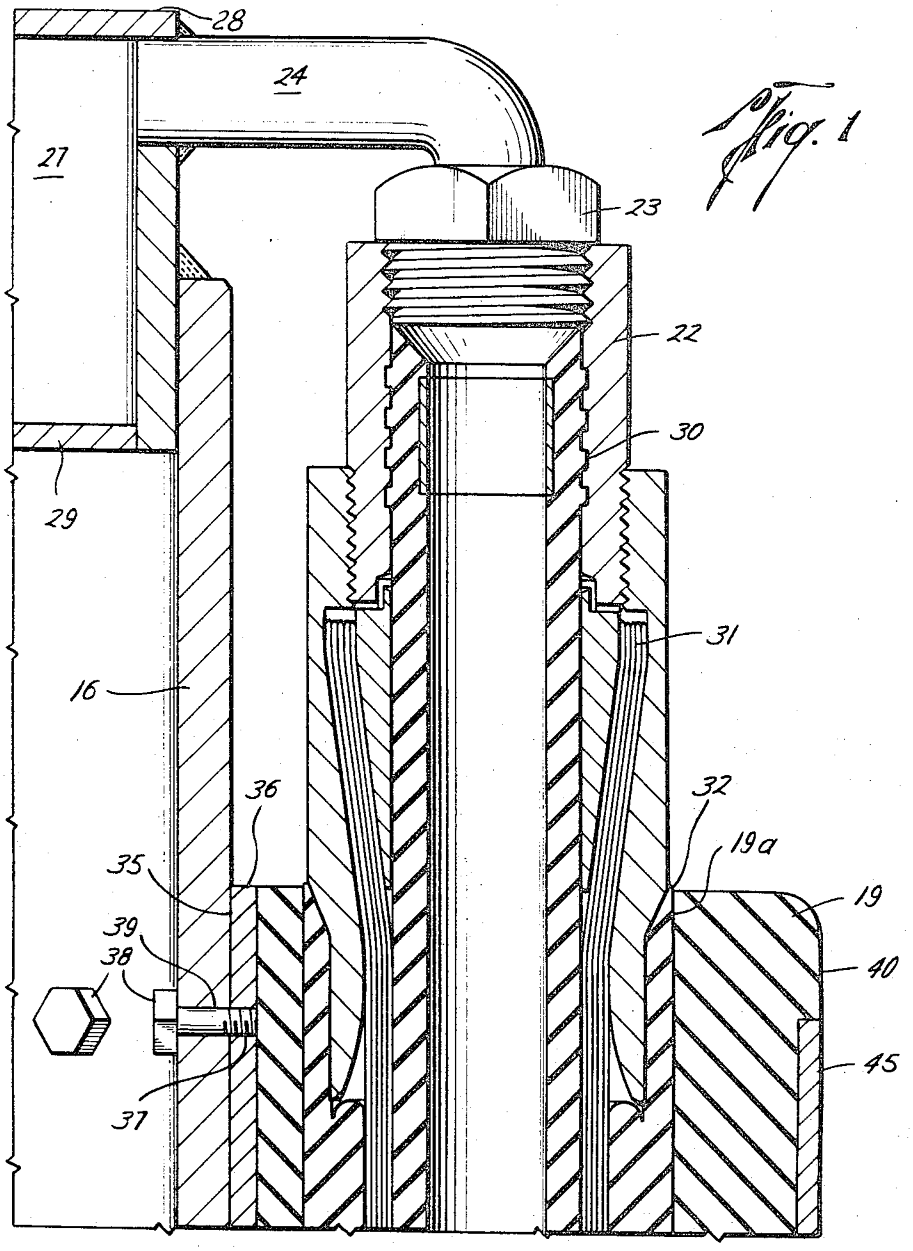
FIG. 1 is an enlarged sectional view showing construction details of one form of the invention wherein the body is formed of a plurality of segments.
Figure 2:
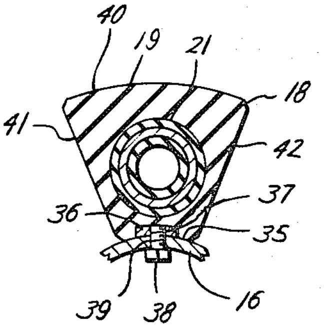
FIG. 2 is an enlarged fragmentary view illustrating a means of securing the inflatable segments used in one form of the invention on the housing on which it is supported.

Attention is first directed to FIG. 1 of the drawings wherein a partial sectional view of the segments used to form the body in one form of the present invention is illustrated. In FIG. 1, the segments 18, better shown in FIG. 2, are shown as being secured to an annular rigid housing 16 which extends longitudinally of the device and provides a means of supporting an annular expandable body designated generally by the numeral 17 and formed by the individual segments 18. The body 17 in the forms illustrated in FIGS. 1 through 8 may be formed by a plurality of longitudinally and circumferentially extending segments 18 as shown in the drawings. The segments 18 include a body of resilient material 19 with an inflatable element 21 positioned therein and extending longitudinally thereof as shown in detail in FIGS. 2 and 4 whereby the segments 18 may be radially expanded when inflating fluid is supplied to the inflatable elements 21. The inflatable elements 21 include heads 22 at each end thereof as more clearly illustrated in FIG. 1 of the drawings. The heads 22 of each inflatable element are blanked off at one end by suitable plug means, and at the other end are shown as being provided with a threaded coupling 23 as shown in FIG. 1, the threaded coupling 23 being adapted to receive a conduit 24 therethrough so as to supply inflating fluid to the interior of the inflatable elements.

Suitable conduit means (not shown) are provided for conducting inflating fluid to the housing 27 formed on the end of the annular rigid body 16 as shown in FIG. 1 of the drawings and may be secured thereto by any suitable means such as welds or the like. The housing 27 is closed by the end flange 28 and end flange 29 and in effect provides a manifold for communicating with each of the conduits 24 which are connected thereto by any suitable means such as welding or the like, the conduits 24 each in turn being communicated with an inflatable element 21.

The structure of the inflatable elements 21 is shown in FIG. 1 of the drawings in greater detail and includes the heads 22 at each end aforementioned, which are adapted to receive and engage an inner resilient member 30, a reinforcing sheath 31 around the inner member 30, and an outer covering or layer 32. The inner tube 30, the reinforcing sheath 31, and the outer covering 32 extend from end to end of the inflatable element 21 and are secured at each end in the heads 22. While only one head is shown in FIG. 1, the arrangement and construction of the head 22 at the other end of inflatable element 21 is similar. As illustrated in the drawings, the inflatable element 21 is shown as being formed separately and inserted in the longitudinal opening **19*a* of the resilient body 19 of the segments 18; however, as a practical matter, in some instances, it may be desirable to integrally form the body 19 of each segment 18 so that the body 19 is an integral part of the resilient element 21. On the other hand, when the resilient member 21 is formed separately from the resilient body 19 and inserted therein in the opening 19*a* of the resilient body 19 of the segment 18, it can be appreciated that should repair or replacement of any part of the inflatable element 21 become necessary, such may be accomplished merely by removing it from the opening 19*a* of the resilient body 19 and effecting whatever repair or replacement may be necessary without disturbing the resilient body 19**.

The body 19 of each of the segments 18 is adapted to be received on the rigid annular housing 16 and secured thereto by any suitable means such as that illustrated in FIG. 2 of the drawings. It will be noted that the annular rigid body 16 abuts one of the circumferential edges 35 of the body 19 which conforms to the housing 16 and extending longitudinally of the body 19 on the circumferential edge 35, there is provided a metal plate 36 which is provided with a threaded opening 37. A bolt 38 may be engaged through a suitable opening 39 in the rigid body 16 and engage with the threaded opening 37 in the plate 36 so as to escure the resilient body 19 in position on the annular rigid housing 16. Any suitable number of bolts may be provided longitudinally of each of the resilient bodies 19 so as to firmly secure each of the bodies 19 on the housing 16 to assume the configuration as illustrated in the drawings.

It will be further noted that in the form of the invention shown in FIGS. 1–5 of the drawings, each of the resilient bodies 19 of the segments 18 is shaped so that its outer circumferential surface 40 is generally arcuate in configuration so that when all of the segments 18 are positioned on the rigid housing 16 as shown in FIG. 2 of the drawings, the body 17 assumes generally a cylindrical configuration. Also, the inner circumferential edges 35 form an axial opening through the body 17. The longitudinal side edges 41 and 42 of each of the resilient bodies 19 are suitably shaped so as to enable the other resilient bodies 19 to be positioned adjacent the rigid housing 16 and assume the relationship shown in the drawings. One shape of the side edges is illustrated in FIG. 2.

Figure 4:
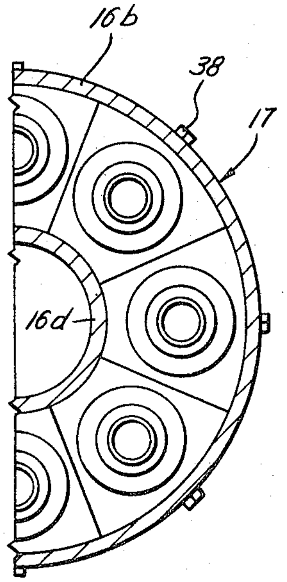
FIG. 4 is a partial sectional view on line 4—4 of FIG. 3 illustrating additional details of the arrangement of inflatable segments to provide a resilient body forming a closure member.

It will be further noted that each of the segments 18 abuts along their longitudinal side edges 41 and 42 when they are positioned on the housing 16 as shown in FIG. 4 of the drawings, and thus, inflating fluid conducted to the inflating element 21 causes each of the resilient bodies 19 to expand radially relative to the rigid housing 16 and throughout their longitudinal lengths.

Figure 3:
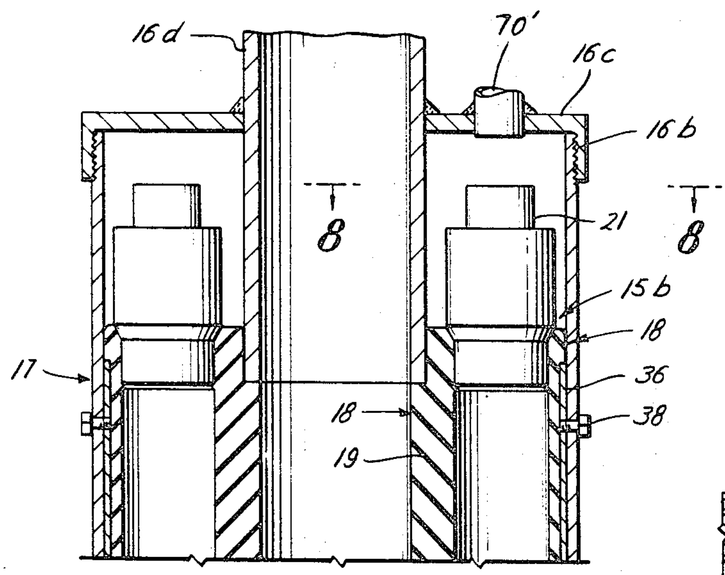
FIG. 3 is a partial sectional view illustrating an arrangement of the individual inflatable segments forming the body to provide a form of closure member and showing the relationship of the individual segments when the closure member is in open position.
Figure 5:
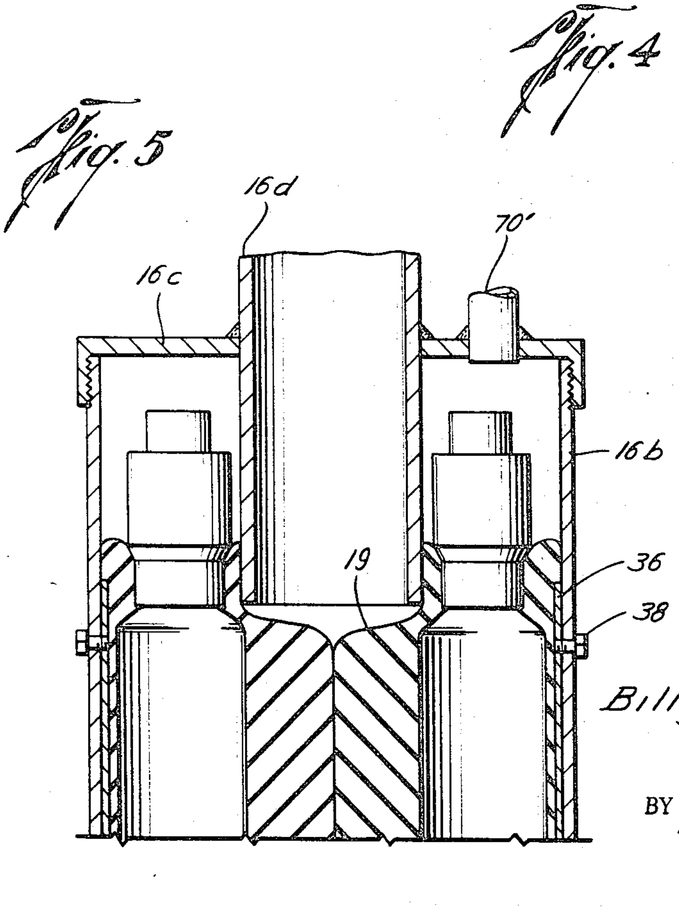
FIG. 5 is a partial sectional view of the resilient body in the closed position when used as a closure member as illustrated in FIGS. 3 and 4.

FIGS. 3, 4 and 5 illustrate the present invention used as a closure member or valve for conduits. In the modification described and shown in FIGS. 1 and 2, it will be noted that the annular body 17 surrounds and is supported on the rigid annular housing 16, whereas in the form of the invention shown in FIGS. 3 through 5, inclusive, the relationship of the rigid body 16 and annular expandable body 17 is changed to accomplish the desired results with the invention.

In FIG. 3, the housing is represented by the numeral **16*b*, and it is noted that the body again is annular in configuration and the annular expandable body is represented by the numeral 15*b*. In the form of invention shown in FIGS. 3 through 5, inclusive, the housing 16*b* is of sufficient size so that the expandable resilient members 19 of the segments 18 may be received therein and secured thereto by means of a longitudinally extending plate 36 provided with an opening for receiving the bolt 38 in the manner as described with regard to the modification shown in FIGS. 1 and 2. However, it will be noted that the position of the plate 36 is changed, and it is now on the circumferential edge of each of the resilient bodies 19 reversed in relation to its position as shown in FIGS. 1 and 2, inclusive. However, the resilient bodies 19 are of the same general configuration and are arranged to abut each other in a manner as described with regard to the FIGS. 1 and 2 modification. The resilient bodies 19 each receive an inflatable element constructed in a manner and positioned in the resilient body 19 of each segment 18 in a manner as described with regard to the FIGS. 1 through 6 modification. It will be noted that the housing 16*b* is provided with plates 16*c* at each end thereof which close off the housing, and an inlet and discharge conduit 16*d* is provided for the housing 16*b* which extends through the end plates 16*c*** as illustrated in FIG. 3.

The inlet and discharge conduits or openings **16*d* are arranged so that they telescopically fit within and abut the ends of the resilient members 19 of the annular body 15***b* in a manner as shown in FIG. 3 of the drawings. The arrangement of the resilient members 19 on the housing 16*b* and their relationship to the inlet and discharge conduit 16*d* in the housing 16*b* form or define a fluid flow conduit through the housing 16*b* and the annular body 15*b*. In the form shown in FIG. 3, one end of the inflatable elements 21 is left open, and the other end of the inflatable elements 21 is closed in a manner as described with regard to FIGS. 1 and 2 so that inflating fluid may be conducted to the housing 16*b* through the conduit 70' to communicate with the open end of each of the inflatable elements 21 to effect inflation thereof and expansion of the resilient bodies 19 of the segments 18. As the bodies 19 expand, they close off the conduit formed by their inner surfaces and thereby close off flow through the housing 16*b* and body 15*b*. This relationship of the components of the present invention is more clearly illustrated in FIG. 5, and it will be noted that the resilient bodies 19 have been expanded radially inwardly relative to the housing 16*b* so that resilient bodies 19 expand to contact each other and seal off flow through the flow conduit formed in the housing and through the segments 18. It can be appreciated that the inflatable elements 21 may be supplied with fluid in any suitable manner, such as that described with regard to the FIGS. 1 and 2 form.

The present invention has particular utility in large water conduits and the like as well as in other situations. Of course, the expansion of the resilient members 19 may be controlled so that the amount of flow can be regulated through the device.

As shown in the drawings, the annular housing 16 and 16*b* is continuous and serves as a backup for the resilient bodies 19 of each of the segments 18 to control their expansion either inwardly or outwardly. It can be appreciated that under some circumstances the exact configuration and construction of the housing may vary to accomplish the desired results of the present invention.

Figure 6:
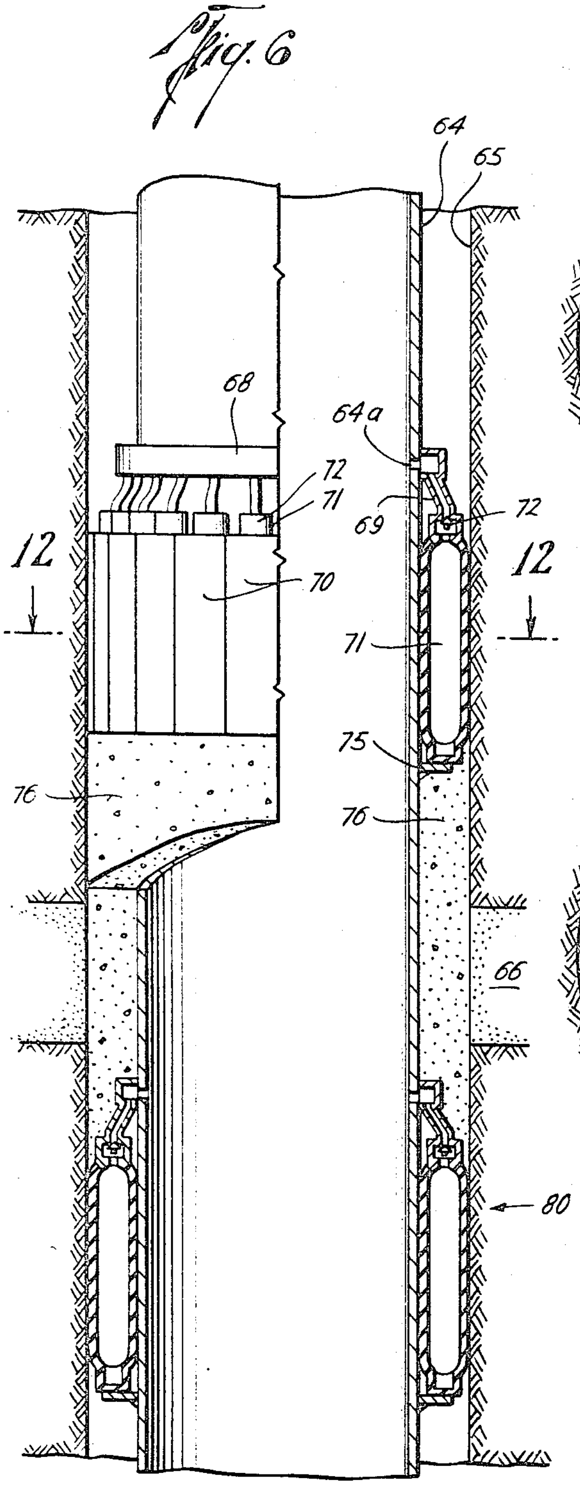
FIG. 6 is a view, partly in section and partly in elevation, of an embodiment of this invention positioned on a shaft liner for isolating and cementing a zone of the subsurface.
Figure 7:
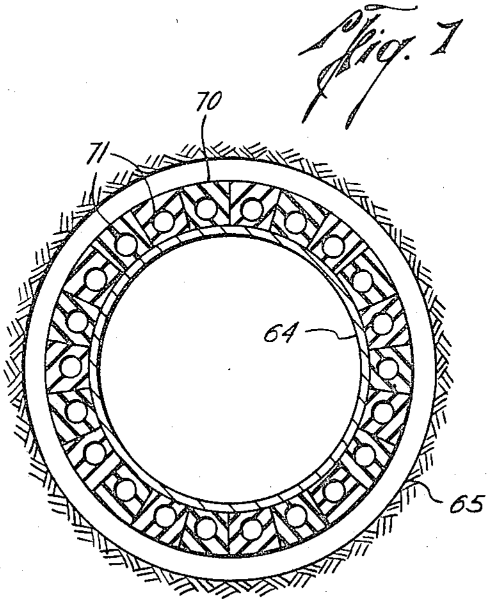
FIG. 7 is a sectional view of the embodiment shown in FIG. 6 and illustrates the components in the deflated condition.
Figure 8:
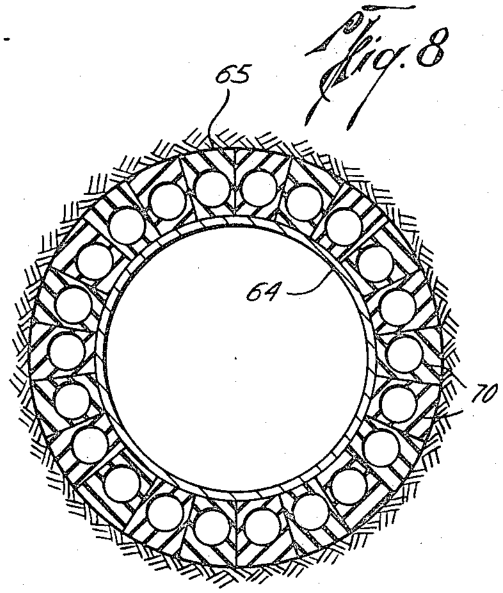
FIG. 8 is a sectional view of the embodiment shown in FIG. 6 taken along the line 8—8 of FIG. 10 to illustrate the relationship of the components when inflated.

An additional embodiment of this invention is illustrated in FIGS. 6–8, inclusive, which is amenable for use in large diameter openings such as in mine shafts, tunnel excavations, and the like. In the drilling of vertically extending shafts through the subsurface to reach buried mineral deposits, to place atomic weapons underground in controlled circumstances prior to detonation, or for other reasons, various types of drill bits are used to dislodge and evacuate earth, rocks, and other debris from a shaft. Such shafts may be lined with a mine shaft liner 64 such as is illustrated in FIG. 6 to prevent cave-in and accumulation of debris at the bottom of the shaft. FIG. 6 illustrates the mine shaft liner 64 positioned in the bore 65 of a vertically extending, large diameter opening of, perhaps, eight feet diameter in the earth's subsurface. Such shafts as the bore 65 frequently encounter various geological formations including water-bearing sands such as the zone indicated at 66 in FIG. 6. It may be appreciated that the extensive penetration associated with a large diameter bore hole through a water-bearing sand engenders extensive flooding of the lower portions of the shaft and may further permit cross mingling of liquids from various sands resulting in pollution of fresh water sands by brine occasionally found in certain geological strata. The modification of this invention illustrated in FIG. 6 is shown in the bore 65 for isolating and cementing off the water-bearing, sandy zone 66.

The mine shaft liner 64 serves as an annular rigid means supporting a circumferentially extending pressure fluid manifold 68 communicating with the interior of the line 64 by means of an opening 64*a*. It may be appreciated that conventional means may be positioned in the shaft liner 64 for supplying pressure fluid to the manifold housing 68 and are believed unnecessary for an understanding of the invention as disclosed in FIG. 6. A plurality of pressure fluid conduits 69 is communicated with the manifold 68 for supplying and distributing pressure fluid for expansion of the invention as will be explained.

In a manner similar to that of the foregoing modification of this invention illustrated in FIGS. 1 and 2 and the embodiment shown in FIGS. 3–5, the embodiment illustrated in FIG. 6 utilizes a plurality of arcuate, inflatable segments 70 extending longitudinally of the shaft liner 64 and encircling the liner to define an inflatable body which is expandable radially outwardly of the shaft liner on inflation. There is positioned in each of the arcuate segments 70 an inflatable element 71, and the elements are communicated with the pressure fluid conduits 60 by valve means indicated generally at 72. The valve means 72 is illustrated in the sectioned portion of FIG. 6 somewhat schematically as a pressure check valve positioned to hold the inflatable elements 71 in the inflated posture of FIG. 6. Just as in the previously described modification of this invention, the pressure fluid conduits 69 which communicate with the encircling member 68 provide means tending to equalize the internal pressure applied to each of the inflatable elements 71 which has the further effect of tending to equalize the extent of deformation on inflation of the arcuate yieldable segments 70.

An encircling, perpendicularly extending anchor plate 75 is provided to cooperate as means for securing the inflatable body about the mine shaft liner 64. Such means further aids in defining and providing structural support for the periphery of the concrete 76 placed in the shaft bore 65.

It may be appreciated from an understanding of FIG. 6 that the inflatable body encircling the mine shaft 64 may be duplicated at another location such as the means indicated generally at 80 at the lower portion of the shaft 64 to define the isolation means which is in the form of an annular, cylindrical volume exterior the outer surface of the mine shaft liner 64 between the inflatable devices, one of which is indicated generally at 80. Of course, such devices may be duplicated for each of fabrication, but the actual structural configuration need not be an exact duplication to seal off the water-bearing sand 66 or other zone.

FIGS. 7 and 8 may be considered to be taken along the line 8—8 of FIG. 6 and thereby provide a contrast between the inflated and deflated conditions of the inflatable device of this invention. More particularly, FIG. 7 illustrates the inflatable body before pressure fluid is admtited to the inflatable elements 71 which are illustrated as providing axially extending chambers for receiving pressure fluid therein to achieve expansion. FIG. 6 illustrates the expanded device in engagement with the mine shaft bore 65 whereby sealing contact with the shaft bore is achieved upon radial expansion of the arcuate yieldable segments 70.

Figure 9:
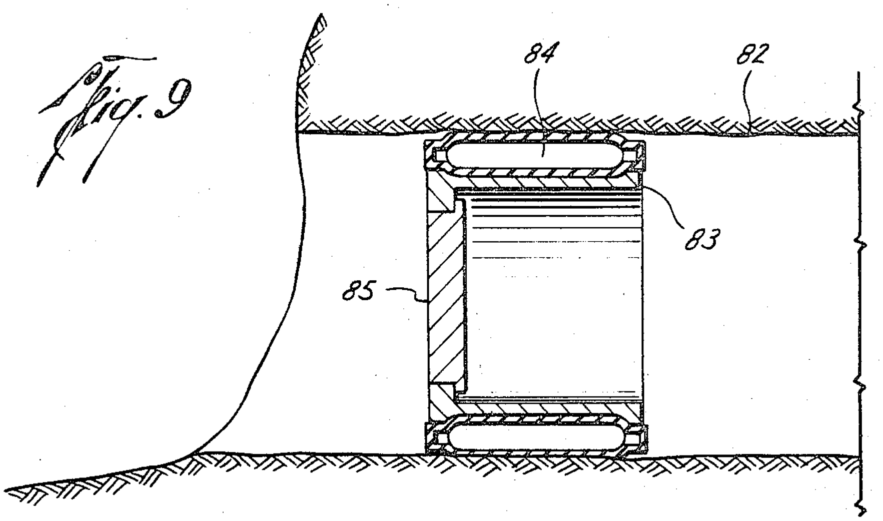
FIG. 9 illustrates a mine lateral sealed by the closure member of this invention including a plurality of inflatable segments.

FIG. 9 illustrates that this invention is amendable to use in mine laterals as well as mine shafts such as the one indicated at 82 for controlling or limiting access through the lateral. For instance, it may be desirable to isolate the lateral to impede the escape of liquids or gases. The embodiment illustrated in FIG. 9 includes a cylindrical extending expandable segments 84 formed of a yieldable material. The segments 84 are preferably similar to the segments previously described and are adapted to receive inflatable elements previously described and are adapted to receive inflatable elements therein for expansion in like manner. The rigid housing 83 supports the inflatable segments 84 so that on inflation of the segments, their parallel placement one to another constrains their inflation radially outwardly of the housing 83 to contact the bore of the excavation 82.

The embodiment illustrated in FIG. 9 preferably includes pressure fluid conduit means for distributing and equalizing pressure fluid within the inflatable segments 84 and such means is similar to or perhaps identical to the means illustrated in the embodiments of FIGS. 1 and 2 or the other modifications. A closure member 85 is positioned in the axial opening of the housing 83, and it may be appreciated that the closure serves as a bulkhead or barrier which is adaptable for various uses. For instance, the member 85 may include a door or hatch suitably positioned in an appropriate frame to permit access of workmen to the sealed off portion of the excavation 82. Of course, other devices may be used in lieu of the seal member 85.

Figure 10:
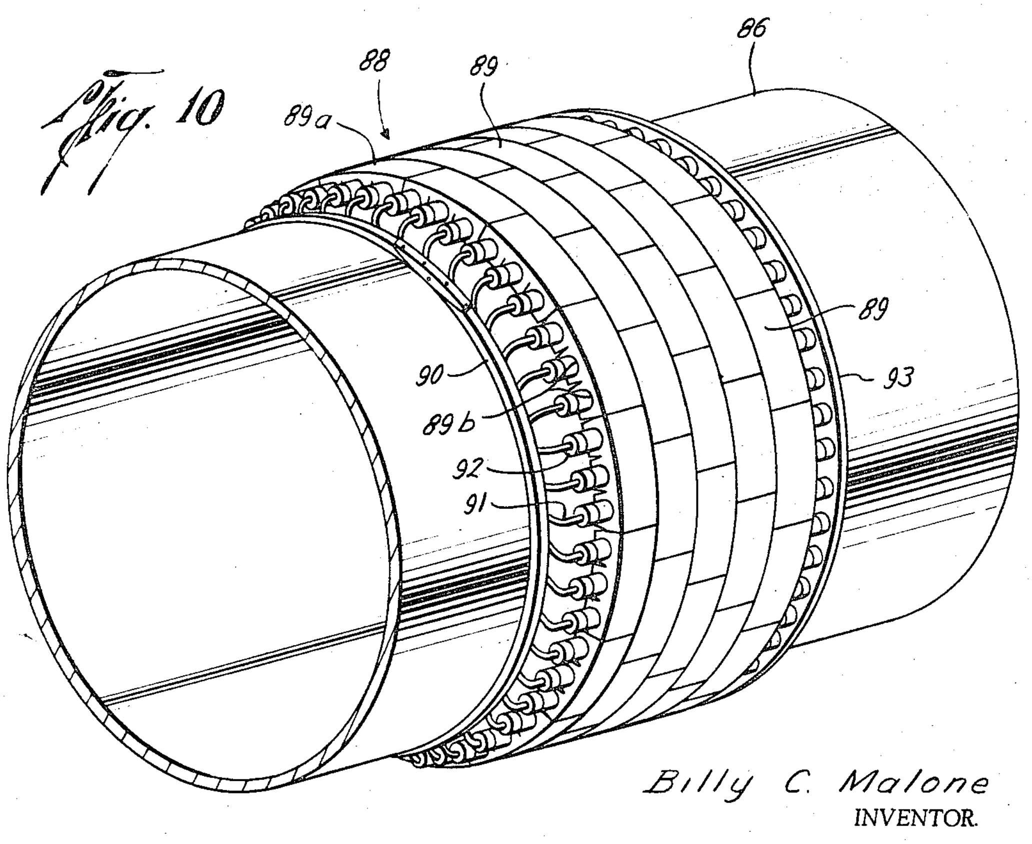
FIG. 10 is a perspective view showing another annular configuration of the invention shown in FIG. 6 positioned in encircling relationship about a mine shaft liner or other similar tubular member of large diameter.
Figure 14:
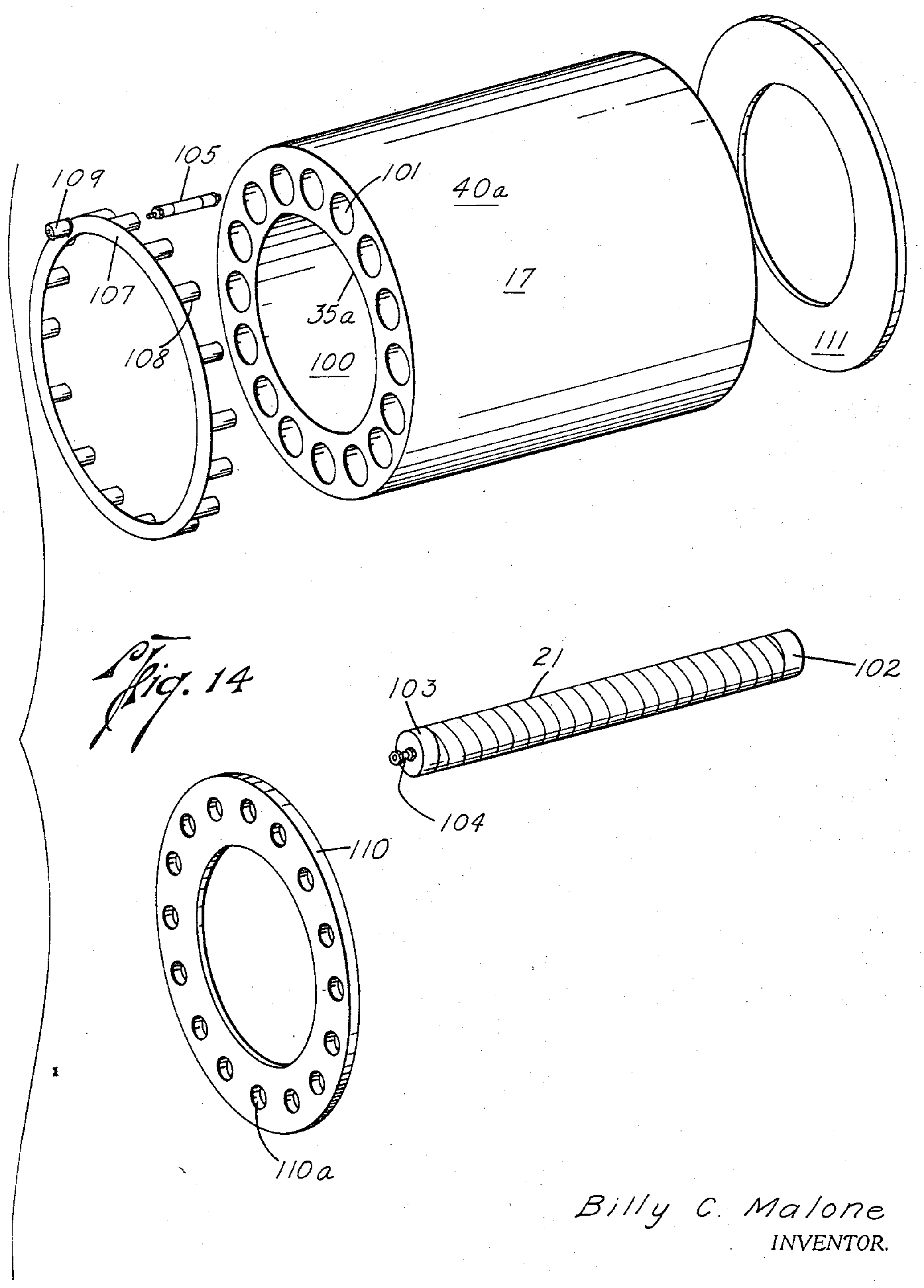
FIG. 14 is an exploded perspective view illustrating an alternate form of resilient body and means for supporting the inflatable element when positioned therein as well as means for supplying inflating fluid to the inflatable elements.

The modification of FIG. 10 illustrates a portion of a tubular member 86, and an inflated segmented body indicated generally at 88 is placed in encircling relationship to the member 86 for use in mine shafts, laterals, or other similar excavations of large diameter. The body 88 includes a plurality of arcuate segments 89 having their greater dimension extending circumferentially of the member 86 with sufficient segments included to define a closed loop such as the loop 89*a* of segments in end-abutting relationship. Each of the segments 89 in the embodiment illustrated in FIG. 14 includes three holes or openings 89*b* which extend longitudinally of the tubular member 86 when positioned about the exterior surface in defining the encircling closed loop. It may be appreciated that the number of arcuate segments 89 included in a loop about a tubular member may be varied, and it will be further recognized from viewing FIG. 10 that the number of loops positioned adjacent one another longitudinally of the tubular member 86 may likewise be varied.

Pressure fluid supply means indicated at 90 is placed parallel to and somewhat apart from the row of arcuate segments defining the loop 89*a* and pressure fluid conduit means 91 is communicated therewith for supplying pressure fluid to each of a plurality of inflatable elements 92. The elements 92 extend longitudinally of the tubular members 86 and terminate at an annular ring 93 defining the segmented inflatable device 88 and likewise providing structural support therefor on the rigid member 86. The inflatable segments 92 extend in length several multiples of the width of the arcuate segments 89 so that a predetermined number of arcuate segments is accommodated on each of the inflatable elements 92. It is to be noted that the multiplicity of arcuate segments positioned about each of the inflatable elements 92 is staggered with reference to the adjacent arcuate segments to thereby achieve an interwoven effect for the segmented inflatable device 88 which avoids the coincidence of end faces of the segments between two adjacent rows. In the particular configuration shown in FIG. 10, each of the segments includes three openings 89*b* and such openings are sequentially interconnected with each inflatable element 92 along its length with respect to the several segments 89 to thereby achieve uniform strength about the entire expandable portion of the segment inflatable device 88. It may be appreciated that such an arrangement does not alter the expansion radially outwardly of the rigid housing member 86 by the arcuate segments in the same manner as the embodiment illustrated in FIGS. 1 and 2.

Figure 11:
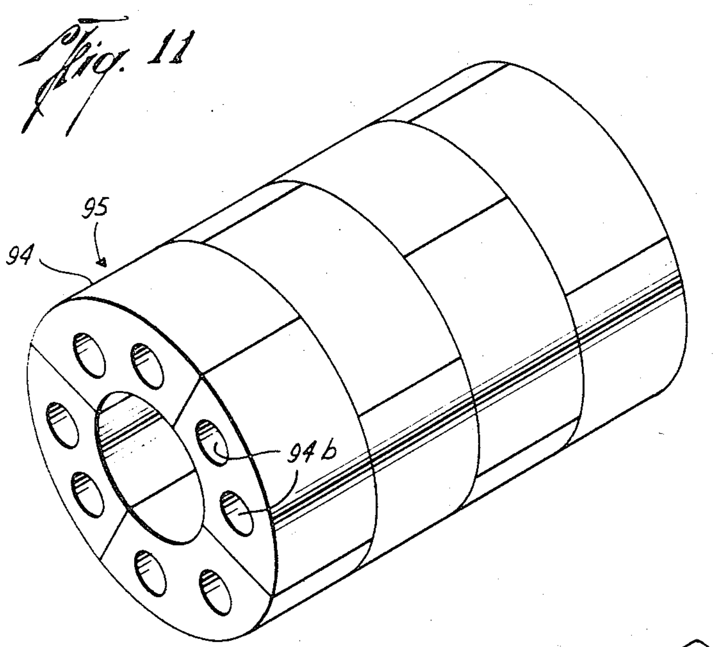
FIG. 11 is a perspective view of an alternate form of the body of this invention which includes a plurality of circumferentially extending arcuate segments.

While the segmented inflatable device 88 illustrated in FIG. 10 includes perhaps a dozen or more arcuate segments 89 in each encircling tier, the embodiment of FIG. 11 discloses an inflatable body indicated generally at 95 comprised of arcuately extending segments 94 with four segments in each circumferential row of the device. Each segment 94 is shown as including two openings 94*b* adapted to receive an inflatable element.

Figure 13:
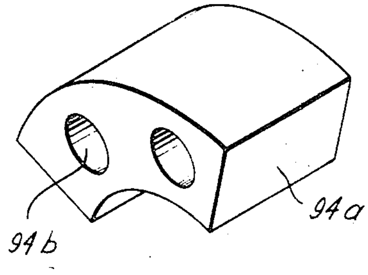
FIG. 13 depicts another construction of the arcuate segments.

Attention is directed to FIG. 13 where one such segment 94 is illustrated in perspective view and is particularly illustrated as having a face 94*a* which is placed in abutting relationship with the face of a similar member. The inflatable elements 21 (not shown) inserted in openings 94*b* align and position the segments 94.

Figure 12:
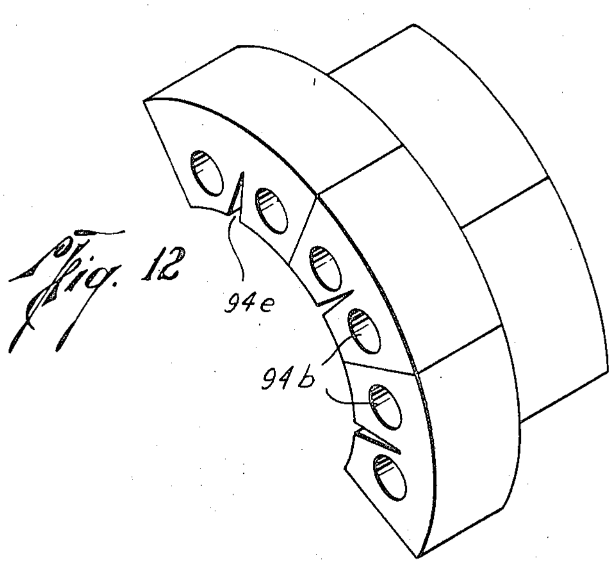
FIG. 12 is a view similar to FIG. 11 showing some details of one construction of the arcuate segments defining the expandable body.

Expansion and contraction of the several arcuate segments comprising such inflatable device 95 may be aided by including a wedge-shaped cut 94*e* between the holes 94*b* to thereby accommodate expansion of the arcuate segments when inflating fluid is administered to the inflatable elements. The wedge-shaped, radially extending incision 94*e* illustrated in FIG. 12 may be contrasted with the arcuate segment of FIG. 13 which is shown without any incision extending outwardly of the curved face. The form of arcuate segment illustrated in FIG. 12 which provides for flexure on inflation may be used as an alternative to the arcuate segment shown in the other figures. It can be appreciated that under some circumstances the exact configuration and construction of the segments and the inflatable body may vary to accomplish the desired results in accordance with the teaching of the present invention.

For example, in FIGS. 14 through 17, the body 17 is illustrated as being of unitary construction rather than formed of a plurality of segments as described hereinbefore.

In this construction, the annular expandable body 17 is formed of any suitable material which will expand, and again is defined by an inner annular or circumferential surface 35*a* which forms an axial opening 100 through the body 17. Also, an outer annular or circumferential surface 40*a* is formed on the body 17.

Spaced circumferentially of the body 17 is a plurality of openings 101 each of which is adapted to receive the inflatable element 21 which is constructed in a manner similarly to that previously described and shown herein.

One of the heads 102 of inflatable element 21 is blanked, and the other head 103 of the inflatable element 21 is provided with a connection 104 for receiving inflating fluid therein. A conduit 105 is provided for connection with the extension 104 on the head 103 and the conduit 105, in turn, is adapted to be connected to a common source of supply 107 of pressure fluid which is provided with suitable extension 108 for connecting through the conduit 105 and thence communicates inflating fluid to the inflating elements 21. The manifold or common source of supply 107 is provided with an inlet 109 for receiving fluid from a source (not shown) to pass to each of the elements 21 in the openings 101 formed between the inner and outer surfaces 35*a* and 40*a*, respectively.

A pair of positioning plates 110 and 111 is illustrated for retaining the inflating element 21 in position in the expandable body 17.

Figure 15:
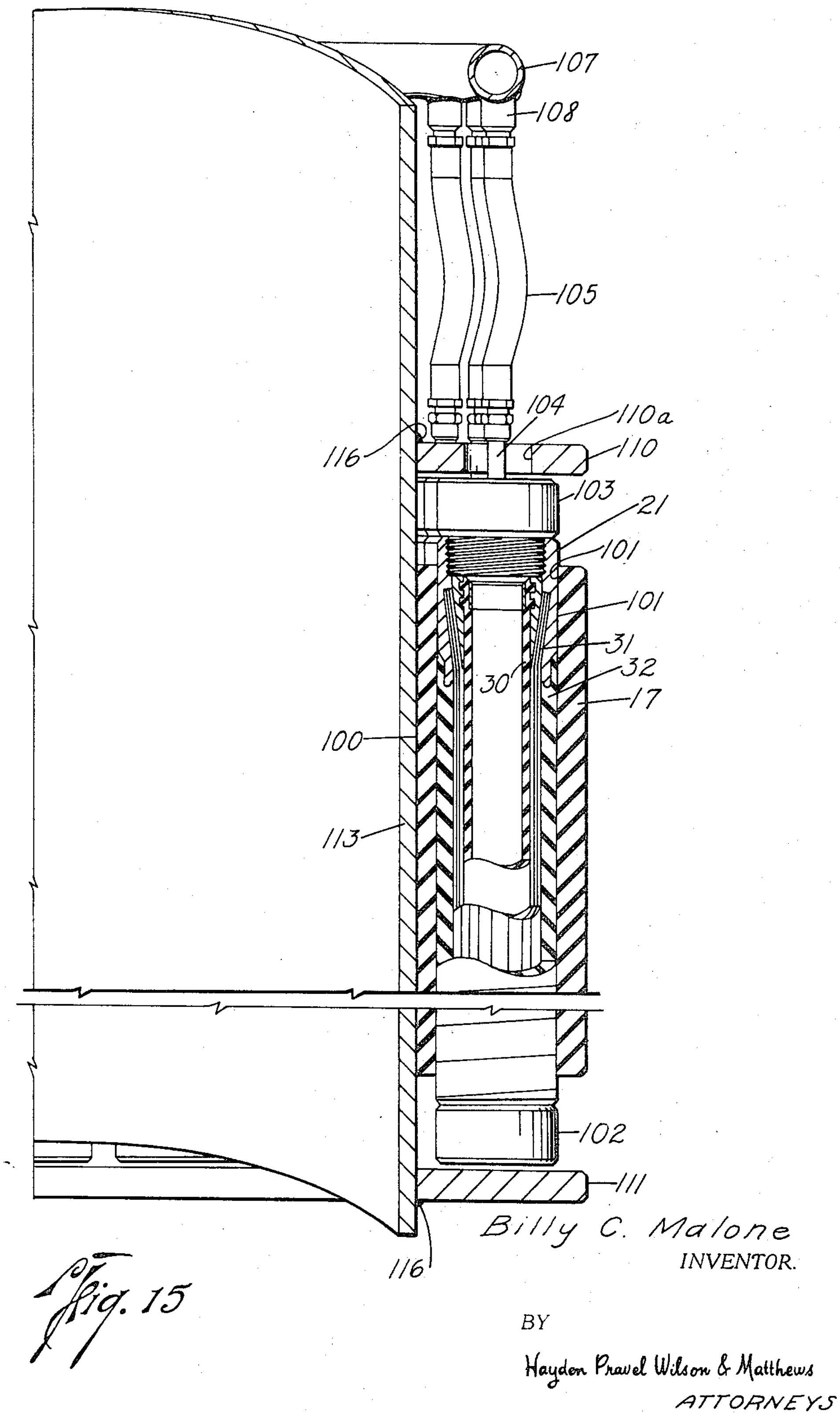
FIG. 15 is an enlarged partial sectional view partly in elevation showing the arrangement of FIG. 14 positioned externally of a member.

In FIG. 15, the arrangement of one of the inflating elements in one of the openings 101 is shown.

It will be noted that plates 110 and 111 are secured about a member 113 by any suitable means such as welding as illustrated at 116 or the like. It will also be noted that the plate 110 is provided with openings 110*a* for communication between the common fluid source 107 and through the extension 108 and conduit 105 and the extension 104 on the packer head 103.

The inflatable element 21 includes an inner tube 30, a reinforcing sheath 31, and an outer covering 32 as described with regard to FIG. 1. The reinforcing sheath 31 which surrounds the inner tube circumferentially enables expansion of the inflatable element 21 without rupturing the element, and this in turn causes the body 17 to expand as fluid is simultaneously supplied to all of the inflatable elements 21.

The plates 110 and 111 retain the element 21 within the opening 101 of the body 17 as each of the elements is inflated or deflated, and it can be appreciated that the body 17 may be secured on the member 113 which extends through the axial bore 100 by any suitable means such as bonding with a suitable cement or glue, or if desired, the opening 100 may be made slightly smaller in diameter than the member 113 upon which it is to be positioned and the member 17 then expanded by any suitable means and inserted in position on the member 113.

Figures 16, 17:
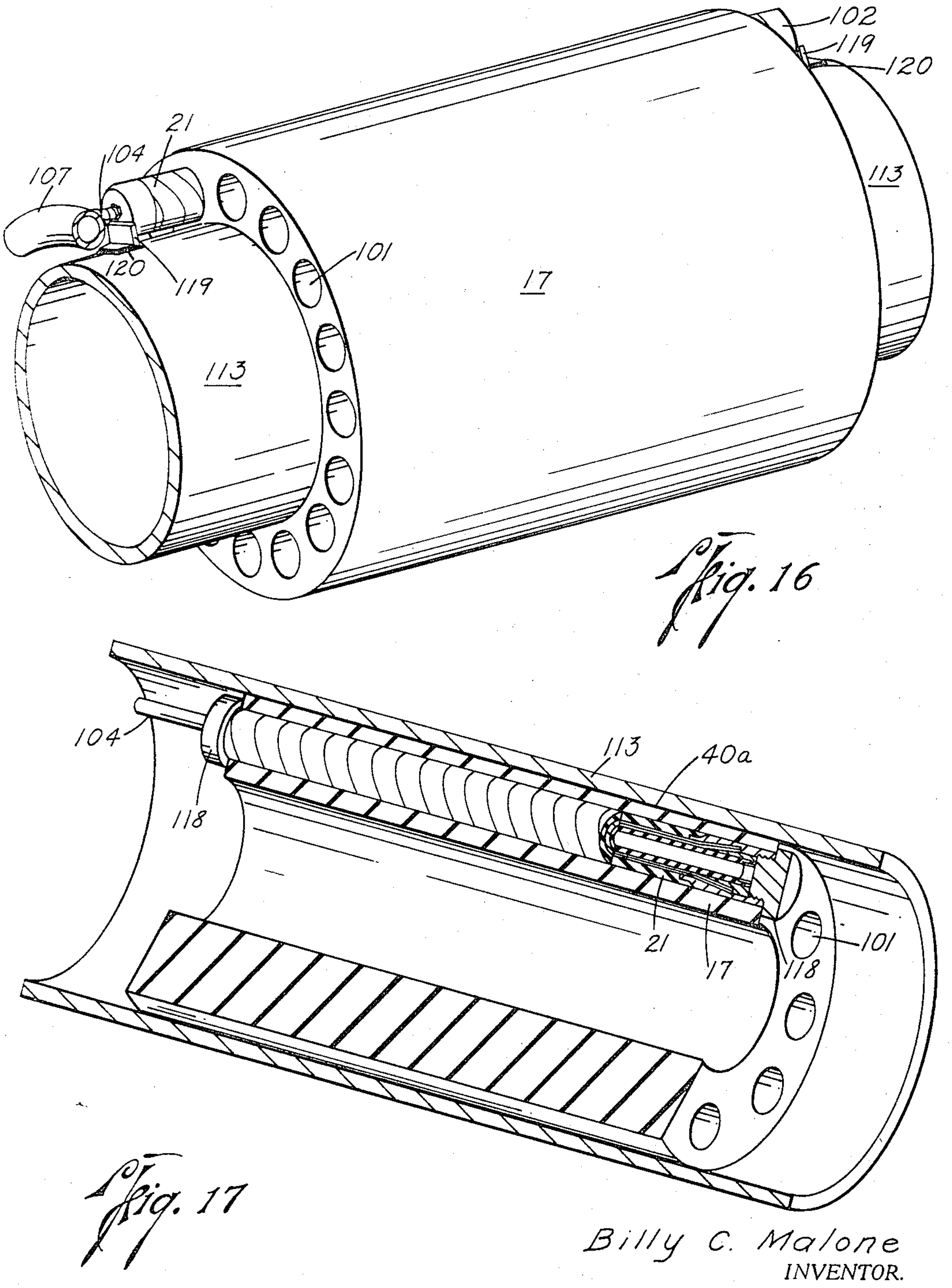
FIG. 16 is a perspective view showing a tubular member positioned through the axial opening in the resilient body and a modified form of means for holding the inflatable element in the circumferentially spaced openings in the body.
FIG. 17 is a sectional view showing the member as being positioned on the external circumferential surface of the resilient body, the resilient body being positioned in the tubular member by any suitable means such as bonding or the like, and such figure also shows an alternate form of retaining the inflatable members in position in the circumferentially spaced openings in the form of enlarged heads or annular flanges on the heads at each end of the inflatable element.

The member 123 serves as a backup for the surface of the member 17 against which it abuts so that when inflating fluid is supplied to the element 21 to expand the body radially, the body moves away from the surface which is immediately adjacent to or abuts the member 113. In FIG. 17, the member 113 is shown as surrounding the body 17, and in this situation, the outer surface 40*a* is adjacent the member 113; however, again, when inflating fluid is supplied to the inflating element 21, the expandable body 17 expands radially away from the member 113 which acts as a backup.

In FIG. 17, an enlarged flange 118 is provided on each of the heads which serves as a means of positioning the inflatable element within each of the openings 101 provided in the body 17.

In FIG. 16, the body 17 is represented as again being positioned on the outer surface of a tubular member 113, and it can be appreciated that in some circumstances it may be desirable to form the expandable body 17 on the member 113 by means well known in the art. During such forming, the holes 101 would also be formed so that upon completion the body 117 would be bonded to member 113 by reason of the curing of the material from which the expandable material is made to the member 113. In FIG. 16, the inflatable element 21 is shown as being positioned relative to the opening 101 in the member 17 by a flange or angle iron 119 secured by any suitable means such as weld 120. Also, in this form of the invention, the manifold or common fluid source 107 is connected directly to the extension 104 on the inflatable element 21.

In the form of the invention shown in FIGS. 15 and 16, it can be utilized in a manner described with regard to the uses illustrated in FIGS. 1, 2 and 6 through 10, respectively, whereas the form of the invention illustrated in FIG. 17 is applicable to the uses illustrated in FIGS. 3 through 5, inclusive, such as for a closure member or for regulating the flow through a conduit, or other purposes.

I claim:

1. A radially expandable and inflatable arrangement comprising:

(a) an annular resilient body having an external generally annular surface and an axial opening extending longitudinally through said body to form an internal generally annular surface in said body;

(b) said resilient body having a plurality of circumferentially spaced openings extending through said body between said surfaces;

(c) said circumferentially spaced openings adapted to receive an inflatable element therein;

(1) said inflatable elements each including means for communicating inflating fluid to expand said elements and annular body; and (2) said inflatable elements including a head at each end thereof, a resilient inner liner, a reinforcing sheath extending longitudinally between said heads and circumferentially of said liner, and means securing said sheath in said heads.

2. The invention of claim 1 including means to maintain said inflatable elements within said circumferentially spaced openings.

3. The invention of claim 1 wherein said resilient body is formed of a plurality of segments.

4. The invention of claim 3 wherein said segments extend longitudinally of the arrangement.

5. The invention of claim 3 wherein said segments extend circumferentially of the arrangement.

6. The invention of claim 1 including a common source of supply of inflating fluid for said inflatable elements.

7. The invention of claim 1 including an annular member abutting one of said body surfaces to back up said surface against which it abuts so that when inflating fluid is conducted to said inflatable elements, said resilient body is expanded radially in a direction away from said abutting member.

8. The invention of claim 7 including means for securing said member to said abutting surface.

9. The invention of claim 7 wherein said resilient body is formed on said member and thereby bonded to said abutting surface of said resilient member.

10. The invention of claim 7 wherein a bonding agent is provided between said member and the surface of said resilent body against which it abuts for securing said body in position relative to said member.

11. The invention of claim 7 for sealing against a bore wall wherein said resilient body surrounds said member to thereby abut said internal annular surface with said member so that when inflating fluid is conducted to said elements, said resilient body expands outwardly to seal against a bore wall.

12. A closure assembly including:

(a) a rigid annular housing;

(b) a fluid inlet in said housing;

(c) a fluid discharge in said housing;

(d) a radially expandable body extending circumferentially of said housing and forming a fluid conductor in said housing that communicates said fluid inlet and said fluid discharge;

(e) said body having a plurality of circumferentially spaced openings;

(f) said openings adapted to receive an inflatable element therein;

(1) said inflatable elements each including means for communicating inflating fluid to expand said elements and annular body;

(2) said inflatable elements including a head at each end thereof, a resilient inner liner, a reinforcing sheath extending longitudinally between said heads and circumferentially of said liner, and means securing said sheath in said heads; and (g) means for connecting with said elements for conducting inflating fluid to said elements to expand said body radially to close off communication between said fluid inlet and said fluid discharge.

13. The invention of claim 12 wherein said body is formed of a plurality of segments.

14. The invention of claim 13 including means for securing each segment to said housing and each segment is provided with at least one of said circumferentially spaced openings.

15. A fluid flow control assembly including:

(a) a rigid annular housing having a fluid inlet and a fluid discharge;

(b) a radially expandable and contractable body extending circumferentially of said housing and forming a fluid conductor through said body communicating said inlet and said discharge;

(c) said body having a plurality of circumferentially spaced openings;

(d) said openings adapted to receive an inflatable element therein;

(1) said inflatable elements each including means for communicating inflating fluid to expand said elements and annular body;

(2) said inflatable elements including a head at each end thereof, a resilient inner liner, a reinforcing sheath extending longitudinally between said heads and circumferentially of said liner, and means securing said sheath in said heads; and (g) means for connecting with said elements for conducting inflating fluid to said elements to expand said body radially to close off communication between said fluid inlet and said fluid discharge.

16. The invention of claim 15 wherein said body is formed of a plurality of segments.

17. The invention of claim 16 including means for securing each segment to said housing and each segment is provided with at least one of said circumferentially spaced openings.

18. An annular closure assembly adapted to extend about a large diameter cylindrical member and insertable into a mine shaft, lateral, or other such excavation for sealably engaging the wall thereof comprising:

(a) a plurality of arcuate segments having at least two openings therein;
(b) a plurality of inflatable elements positioned in the openings of said segments;
(c) said elements each including a head at each end thereof, a resilient inner liner, a reinforcing sheath extending longitudinally between said heads and circumferentially of said liner, means securing said sheath in said heads;
(d) said segments being arranged to define a closed loop and forming an interlocking connection with said elements longitudinally of said element; and
(e) means connected to said elements for conducting inflating fluid thereto to expand the closure assembly into contact with said mine shaft or other such excavation.

19. An expandable arrangement adapted to be positioned in a mine shaft or other such excavation for sealably engaging the wall thereof comprising:

(a) a mine shaft liner;
(b) a plurality of segments of resilient expandable material positioned longitudinally along said liner, said segments having openings extending therethrough;
(c) means for positioning said segments in an encircling arrangement about the liner;
(d) an inflatable element positioned in each of said openings in said segments for receiving inflating fluid to expand said segments;
(e) said elements each including a head at each end thereof, a resilient inner liner, a reinforcing sheath extending longitudinally between said heads and circumferentially of said liner, means securing said sheath in said heads; and
(f) means connected to said elements for conducting inflating fluid thereto to expand said segments radially outwardly of said liner into sealing contact with the mine shaft wall.

20. The invention of claim 19 wherein the means of (b), (c), (d) and (e) are duplicated at least twice longitudinally of said shaft liner to define means for isolating a zone of the mine shaft.

21. An expandable device adapted to be positioned about a mine shaft liner for sealably engaging the wall thereof:

(a) a plurality of arcuate segments having at least two openings therein;
(b) a plurality of inflatable elements positioned in the openings of said segments;
(c) said elements each including a head at each end thereof, a resilient inner liner, a reinforcing sheath extending longitudinally between said heads and circumferentially of said liner, means securing said sheath in said heads;
(d) means carried on said mine shaft liner for conducting inflating fluid to said elements in said segments to expand said segments radially of the mine shaft liner; and
(e) said arcuate segments being arranged to form at least two loops about the mine shaft liner in end-abutting relationship with the segment ends in adjacent loops being circumferentially displaced relative to one another.

22. A radially expandable and inflatable arrangement for sealably engaging and closing an opening comprising:

(a) an annular rigid housing;
(b) a plurality of segments of resilient expandable material secured to said housing and forming an annular expandable body on said housing, said segments having openings extending therethrough;
(c) an inflatable element positioned in said openings of said segments for receiving inflating fluid to expand said segments;
(d) said element including a head at each end thereof, a resilient inner liner, a reinforcing sheath extending longitudinally between said heads and circumferentially of said liner, means securing said sheath in said heads; and
(e) means connected to said elements for conducting inflating fluid thereto to expand said annular body radially of said housing on which it is supported for sealably engaging and closing an opening.

23. The invention of claim 22 wherein said segments extend longitudinally of the arrangement.

24. The invention of claim 22 wherein said segments extend circumferentially of the arrangement.

25. The invention of claim 22 wherein the arrangement defines an annular device adapted to be positioned about a mine shaft liner or other large diameter cylindrical member.

26. A closure assembly including:

(a) a rigid annular housing;
(b) a fluid inlet in said housing;
(c) a fluid discharge in said housing;
(d) a radially expandable body extending circumferentially of said housing and forming a fluid conductor in said housing communicating said fluid inlet and said fluid discharge;
(e) said body including a plurality of inflatable expandable segments;
(f) means securing said segments on said housing, said segments having openings therethrough and an inflatable element in said segment openings;
(g) said element including a head at each end thereof, a resilient inner liner, a reinforcing sheath extending longitudinally between said heads and circumferentially of said liner, means securing said sheath in said heads; and
(h) means connected with said segments for conducting inflating fluid to said segments to expand said body radially to close off communication between said fluid inlet and said fluid discharge.

27. A fluid flow control assembly including:

(a) a rigid annular housing having a fluid inlet and a fluid discharge;
(b) a radially expandable and contractable body extending circumferentially of said housing and forming a fluid conductor through said body communicating said inlet and said discharge;
(c) said body including a plurality of expandable and contractable segments;
(d) means securing said segments on said housing, said segments having openings therethrough and an inflatable element in said segment openings;
(e) said element including a head at one end thereof, a resilient inner liner, a reinforcing sheath extending longitudinally between said heads and circumferentially of said liner, means securing said sheath in said heads; and
(f) means connected with said segments for conducting fluid to said segments to expand and contract said body radially to control the fluid flow through said conductor formed in said body.

28. A radially expandable and inflatable arrangement for sealing against a bore wall comprising:

(a) a rigid annular housing;
(b) a plurality of resilient segments secured to said housing and forming an annular expandable body on said housing, said segments having openings extending longitudinally from end to end, an inflatable element in said segment openings;
(c) said element including a head at each end thereof, a resilient inner liner, a reinforcing sheath extending longitudinally between said heads and circumferentially of said liner, means securing said sheath in said heads; and
(d) means connected with said segments for conducting inflating fluid to said segments to expand said annular body radially of said housing on which it is supported to sealably engage with the bore wall.

References Cited

UNITED STATES PATENTS

| | | | |
|---|---|---|---|
| 672,475 | 4/1901 | Cavallaro | 166—67 |
| 1,221,733 | 4/1917 | Henderson | 138—93 X |
| 1,906,151 | 4/1933 | Goodman | 138—93 |
| 2,233,205 | 2/1941 | Frantz | 299—21 |
| 2,611,437 | 9/1952 | Lynes | 277—34.6 |
| 2,778,432 | 1/1957 | Allen | 277—34 |
| 2,783,028 | 2/1957 | Jamison | 277—34.3 X |
| 3,222,076 | 12/1965 | Hollingsworth | 277—34 |

SAMUEL ROTHBERG, *Primary Examiner.*